United States Patent [19]

Kranjec

[11] Patent Number: 4,607,576
[45] Date of Patent: Aug. 26, 1986

[54] PANEL MOUNTING ARRANGEMENT

[76] Inventor: Stan Kranjec, 355 Signet Drive, Weston, Ontario, Canada, M9L 1V3

[21] Appl. No.: 813,349

[22] Filed: Dec. 26, 1985

Related U.S. Application Data

[63] Continuation-in-part of Ser. No. 670,942, Nov. 13, 1984, abandoned.

[51] Int. Cl.$^4$ ............................................. A47B 57/20
[52] U.S. Cl. .................................. 108/110; 108/107; 108/111; 108/159; 248/188.8; 403/254
[58] Field of Search ............... 108/107, 110, 111, 144, 108/159; 248/188.8; 312/257 SK; 403/230, 252, 254

[56] References Cited

U.S. PATENT DOCUMENTS

| | | | |
|---|---|---|---|
| 2,256,996 | 9/1941 | Bales | 108/99 X |
| 2,869,694 | 1/1959 | Breckheimer | 403/231 X |
| 3,114,578 | 12/1963 | Hamilton | 403/254 X |
| 3,484,068 | 12/1969 | Yoder | 403/230 X |
| 3,490,797 | 1/1970 | Platte | 403/231 X |
| 3,545,712 | 12/1970 | Ellis | 403/231 X |
| 4,034,683 | 7/1977 | DiCenzo | 108/111 |

FOREIGN PATENT DOCUMENTS

| | | | |
|---|---|---|---|
| 2911009 | 10/1980 | Fed. Rep. of Germany | 108/111 |
| 5538 | of 1894 | United Kingdom | 108/107 |

Primary Examiner—William E. Lyddane
Assistant Examiner—Peter R. Brown

[57] ABSTRACT

The present invention provides a panel mounting arrangement for mounting a panel in a generally horizontal position from a panel support. The panel support includes mounting surfaces at generally right angles to one another with each mounting surface being provided with an upwardly opening pocket. The panel itself is provided with a downturned corner flange including first and second tongue portions formed directly in the flange so as to fit downwardly into the first and second pockets of the panel support during assembly of the arrangement. As the tongue portions fit down into the pockets there is both a side to side as well as a front to back wedging on the tongue portions to provide an extremely tight fitting of the tongue portions in their respective pockets.

5 Claims, 8 Drawing Figures

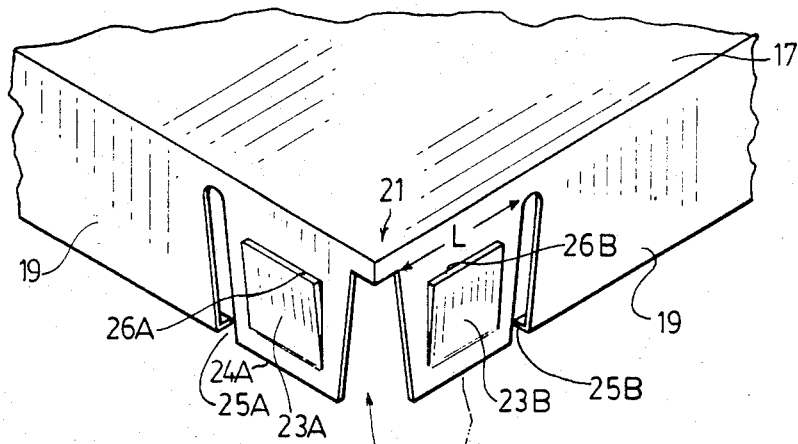
FIG. 3.
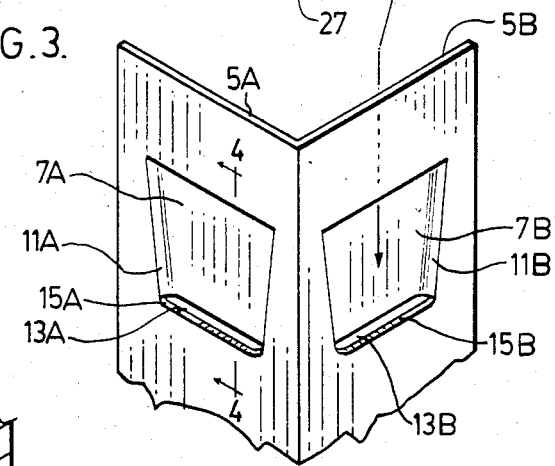
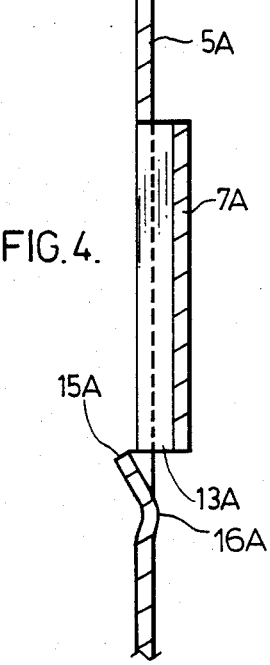
FIG. 4.  FIG. 5.

4,607,576

PANEL MOUNTING ARRANGEMENT

This application is a continuation in part of application Ser. No. 670,942 filed Nov. 13, 1984, now abandoned.

FIELD OF THE INVENTION

The present invention relates to a panel mounting arrangement particularly useful in a knock down shelving structure and includes a right angular corner support having pockets for receiving tongues formed in the corner flange of a panel to be supported in a generally horizontal position from the corner support.

BACKGROUND OF THE INVENTION

There are presently available many different types of storage shelf systems. The most common of these systems is one which comprises horizontal shelf panels bolted or screwed to upright support members at the four corners of the shelf panels. Typically these systems suffer from the drawback that they are awkward to put together and once assembled, are very unstable due to the pivotal-type connections at the four corners of the shelf panel with the upright supports.

Other types of systems have been proposed in which the shelf panel is provided with a downturned flange adapted to fit within a tongue provided on the upright support. However, these proposed systems also suffer from drawback in that the entire structure is dependent upon the strength of the tongue on the support member which is susceptible to collapsing under any substantial load.

SUMMARY OF THE PRESENT INVENTION

The present invention provides a panel mounting arrangement particularly suited in a shelf assembly. The panel mounting arrangement of the present invention is used to mount a panel in a generally horizontal position from a panel support having first and second mounting surfaces at generally right angles to one another. Each of these mounting surfaces is provided with an upwardly opening pocket and each pocket is side edge secured to its respective mounting surface to ensure the integrity and strength of the pockets.

The panel is provided with a downturned corner flange including first and second tongue portions. The flange is open to either side of each tongue portion whereby the first and second tongue portions of the corner flange fit downwardly into the first and second pockets of the panel support during assembly of the panel mounting arrangmement.

Each of the pockets is completely open from top to bottom with the mounting surface from which each pocket is formed being provided with an inwardly directed region extending at least into the plane of the pocket below the bottom pocket opening such that the tongue after penetrating through the pocket wedges on the inwardly directed region of the mounting surface. In addition each of the side edges of the pocket converges downwardly inwardly with the outer edges of the tongue wedging against the side edges of the pocket for a double wedge tightened fitting of the tongue and pocket.

The arrangement of the present invention is one which is particularly easy to assemble without requiring the use of any nuts, screws, bolts, or the like, which are generally the weak areas in a standard panel mounting arrangement making the arrangement of the present invention particularly durable and sturdy. Furthermore, the structure is readily knocked down and reassembled adding further to the benefits of the arrangement.

BRIEF DISCUSSION OF THE DRAWINGS

The above, as well as other advantages and features of the present invention will be described in greater detail according to the preferred embodiments of the present invention in which:

FIG. 3 is a further perspective view showing the outside surface of the panel support and the corner construction of the panel from FIG. 2;

FIG. 4 is a sectional view taken along the lines 4—4 of FIG. 3;

FIG. 5 is a view similar to FIG. 4 showing the downturned flange of the panel mounted in the panel support;

DETAILED DESCRIPTION ACCORDING TO THE PREFERRED EMBODIMENTS OF THE PRESENT INVENTION

Figure 1:
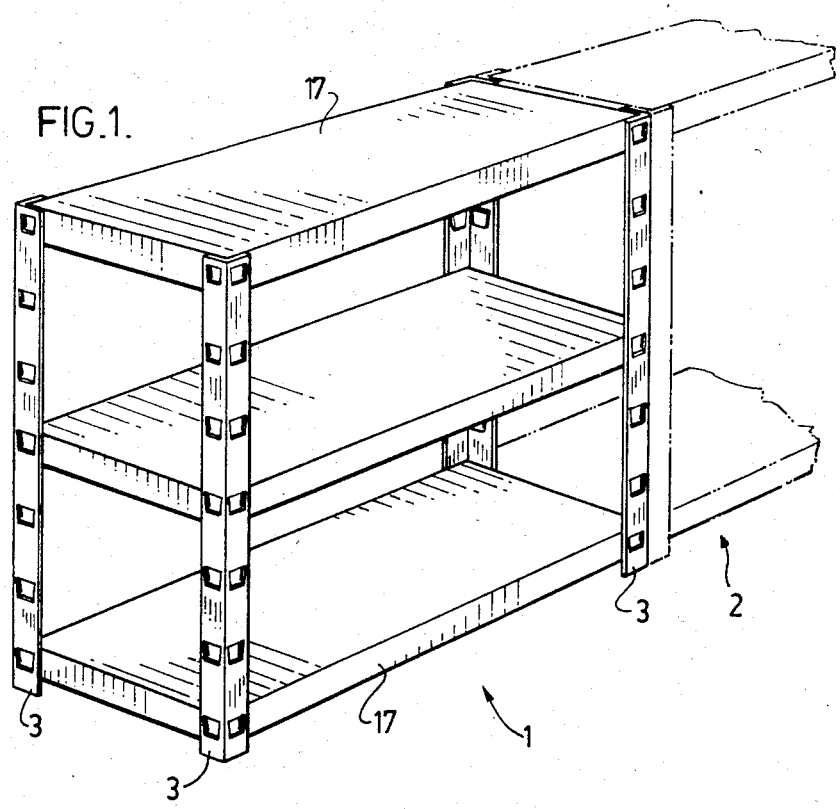
FIG. 1 is a perspective view looking down on an assembled shelving unit using the panel mounting arrangement of the present invention.

FIG. 1 shows a shelf construction generally indicated at 1 comprising four upright corner supports 3 for supporting a plurality of panels of shelves 17. Also shown in phantom in FIG. 1 and indicated at 2 is a second shelving unit which can easily be interconnected with shelving unit 1.

Figure 2:
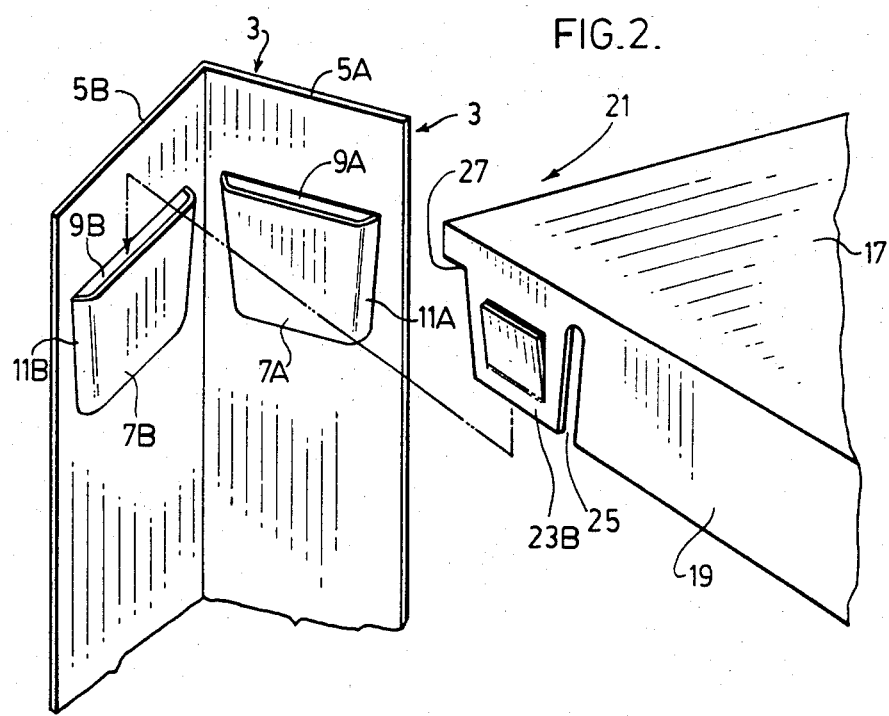
FIG. 2 is an exploded perspective view showing the inner surface of an upright support as well as a corner contruction for a panel to fit in that upright support.

Referring primarily to FIGS. 2 and 3, each of the upright corner supports 3 includes mounting surfaces 5A and 5B extending at generally right angles to one another. Provided in each of these mounting surfaces are a pair of pockets 7A and 7B respectively. These two pockets 7A and 7B, in this particular embodiment are located diagonally across from one another on the inner sides of the two mounting surfaces with pocket 7A having a top opening 9A and pocket 7B having a top opening 9B. Each of the pockets is punched formed directly from the material in the support member and as such, each of the pockets 7A and 7B remain secured along their side edges 11A and 11B to the upright support member. This side edge securing ensures the strength of each of the pockets against folding downwardly under substantial loads.

As best seen in FIGS. 3 through 5, pocket 7A is open at its lower end 13A with mounting surface 5A being flared outwardly at 15A at the lower end of the pocket. A similar construction is formed on mounting surface 5B where pocket 7B is open at its lower end 13B, bordered by a forward flared section 15B.

Returning to FIGS. 2 and 3, each of the shelf panels 17 has a downturned flange 19 with a corner region generally indicated at 21. Each corner region 21 comprises tongue portions 23A and 23B formed directly from the flange with a corner opening 27 provided between the two tongue portion. Flange 19 is further provided with openings 25A and 25B to either side of the tongues which enables the two tongues 23A and 23B to slide downwardly into pockets 7A and 7B respectively. Each of the tongues is of a length such that it penetrates completely through the pockets, as seen in FIG. 5 where the lower end 24A of tongue 23A extends downwardly through the open lower end 13A of pocket 7A. Here it further will be seen that flared region 15A of mounting surface 5A acts in a guiding or cam manner to ensure the proper fitting of the lower end 24A of tongue 23A completely through its mounting pocket.

As seen in FIGS. 4 and 5 support member 5A is bent to extend at least into the plane of the pocket at region 16A immediately beneath flared region 15A. Therefore as the tongue clears through the bottom of the pocket and past the flared region, its lower end is deflected or wedged inwardly as seen in FIG. 5. This provides a first wedging of the tongue which in co-operation with a second wedging as decribed immediately below results in an extremely tight and secure fitting between the tongue and the pocket.

Figure 6:
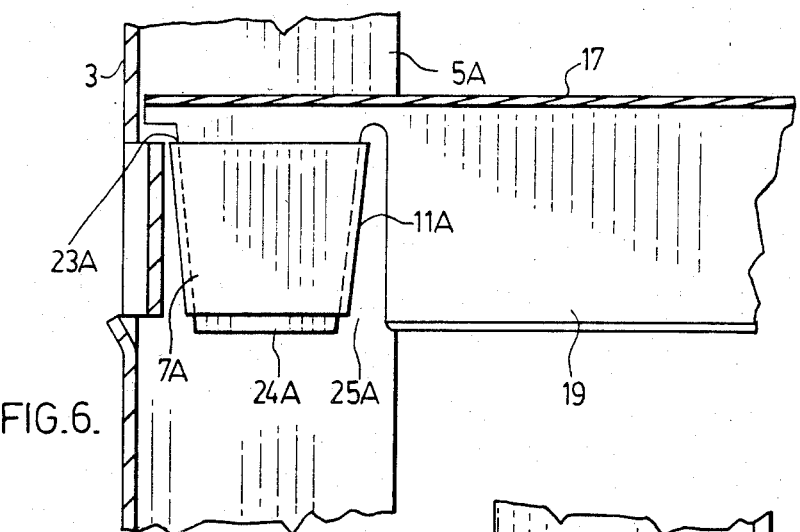
FIG. 6 is a sectional view from the inside the fitting of the panel into the panel support of FIG. 3.
Figure 7:
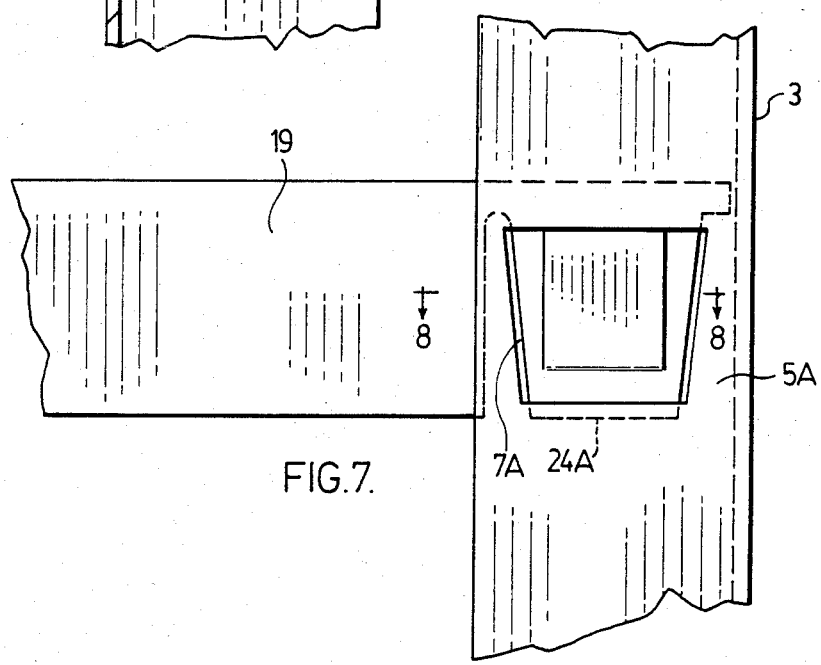
FIG. 7 is an outside plan view of the arrangement shown in FIG. 6.
Figure 8:
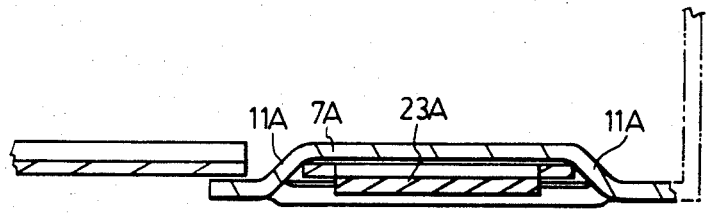
FIG. 8 is a sectional view along the lines 8—8 of FIG. 7.

As well seen in the drawings, and particularly in FIGS. 6 and 7, each of the tongues 23A and 23B, as well as each of the receiving pockets 7A and 7B, has a wedge-shaped configuration which is particularly advantageous in that it provides increased locking action between the tongue portions and the pockets with increased load on each of the shelf panels. Again, it can be seen in FIG. 6 that tongue 23A is of increased height relative to pocket 7A allowing a full wedge interlock between the tongue and the receiving pocket. However, as can be further seen in FIG. 8, the pocket itself is wider at its open upper end from front to back then the tongue, making initial fitting, or sliding of the tongue into the pocket, extremely easy and it is only as the tongue fits well down into the pocket that its outer edges come into contact with the pocket edges 11A to provide the wedging action between the tongue and the pocket. Since the pocket is open at its lower end the tongue is allowed to penetrate to the depth required for a tight wedge fit which reduces the criticality of the fitting between the tongue and pocket. Furthermore, with full penetration completely through the pocket there is the additional wedging action between the tongue end and the upright support as described above to provide a double wedge action tightening of the tongue in the pocket.

A further feature of the present invention is provided in the interlocking between the tongues and the pockets. As will be seen again in FIGS. 2 and 3, tongues 23A and 23B are each provided with tabs 26A and 26B, respectively. These tabs are formed by actually stamping or punching material directly from the tongues and bending the tabs out of plane with the remainder of the tongue.

The purpose of the tabs is to ensure that once the tongues are fully fitted in position, they interlock with the pocket. As such, as the tongue is forced downwardly into the pocket, the tab is pressed back into the plane of the tongue allowing the tongue to be slid downwardly into the pocket. However, once the tongue is fully engaged within the pocket, the tab springs back to its normal position out of plane with the remainder of the tongue where the tab locks beneath the opening to the pocket mouth on the panel support member preventing the tongue from being pulled directly out of the pocket without first pressing on the tab to release the tongue.

The usefulness of the tab is further noted when considering the wedge fitting of the tongue in its pocket where there might otherwise be a tendency for the tongue to be pushed upwardly out of the pocket. However the tab is set at a height to allow a full wedge penetration of the tongue in the pocket and to then snap into a locking position to lock the tongue at that penetration and to maintain the wedge tightened tongue and pocket fitting.

In order to withdraw the tongue from the panel the tab is simply pushed back into plane with its respective tongue at which point the tongue can be pulled upwardly out of the pocket.

With the arrangement described immediately above, even though no nuts or bolts are used in securing the joint, it is still positively locked in both an up and a down direction ensuring that the panel will not only be capable of holding heavy loads but at the same time, ensuring that the panel will not be inadvertently lifted upwardly out of its panel supports.

As described above, the pockets themselves derive their strength from the fact that they are integral with the upright supports and not formed as separate tongues. The tongues in the flange of the panel also derive strength from the fact that they are at 90 degrees to one another so that any tendency at either of the tongues to fold along its weakest region is supported by the strength of the tongue on the adjacent face of the flange. i.e., in referring to FIG. 3, any tendency of tongue 23A to fold under load is prevented due to the support provided by the length L of material at the upper end of tongue portion 23B and vice versa. Therefore, not only is the mounting arrangement of the present invention free of any weak pivotal joints, as found in a nut and bolt assembly, but in addition, tends to strengthen rather than weaken under increased load. Furthermore, it will be clearly understood from the description above, that the entire shelf unit can be quickly and easily assembled without requiring the use of any special tools.

FIG. 1 shows a shelving unit which the lowermost panel 17 is located directly at the bottom ground level of the unit. This again, is particularly advantageous in that once this panel is quickly and easily mounted within the four corner supports it is self supporting and holds the supports in an upright position ready to receive further panels or shelves at different heights upwardly along the upright support members.

It is to be appreciated that the panel mounting system as described above need not be limited to the assembly of a shelving unit and can equally as well be used in mounting many different types of panels in a generally horizontal position from a support member for those panels.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A shelving arrangement in which at least one shelf panel is mounted in a generaly horizontal position from a plurality of up right support members, each of said support members having a pair of mounting surfaces at generally right angles to one another and each mounting surface being provided with an inwardly facing upwardly opening pocket press formed from its respective mounting surface whereby each pocket is top and bottom opening and is side edge secured to the mounting surface from which it is formed, said shelf panel having a down turned flange including corner regions for interlocking at said upright support members, each corner region including first and second tongue portions at right angles to one another on said down turned flange which is open to either side of each tongue portion with said first and second tongue portions of said corner regions sliding downwardly into said first and second pockets of said upright support members during assembly of said shelving arrangement, each said mounting surface having an inwardly directed region extending at least into the plane of the pocket below the bottom opening thereof and each tongue after penetrating through the pocket wedging on said inwardly directed region and the side edges of the pocket converging downwardly inwardly for outer edge wedging with the tongue for a double wedge tightened fitting of the tongue and pocket.

2. A shelving arrangement as claimed in claim 1 wherein the mounting surfaces from which the pockets are formed are bent outwardly away from the pockets substantially level with the open bottoms thereof.

3. A shelving arrangement as claimed in claim 1 wherein the mounting surfaces of said support members include openings directly to each pocket and wherein said tongue portions include locking tabs for interlocking with said support members, said locking tabs being located at said openings with said tongues fitted in said pockets to expose said tabs and to enable releasing thereof for disassembling said shelving arrangement.

4. A shelving arrangment as claimed in claim 1 wherein the top opening of each pocket is wider from front to back than each tongue portion to readily enable initial fitting of said first and second tongue portions into said first and second pockets.

5. A shelving arrangement as claimed in claim 1 including a plurality of said shelf panels one of which is located at ground level for self support and for holding said support members in an upright position to receive further ones of said shelf panels.

* * * * *